Sept. 28, 1954  W. G. SECK  2,689,969
SUCTION CLEANER HAVING PROPELLING
HANDLE AND FILTER BAG ASSEMBLY
Filed Dec. 12, 1950  6 Sheets-Sheet 1

Fig. 1

INVENTOR.
Werner G. Seck
BY
Harry S. Demarsh
ATTORNEY.

Sept. 28, 1954 W. G. SECK 2,689,969
SUCTION CLEANER HAVING PROPELLING
HANDLE AND FILTER BAG ASSEMBLY
Filed Dec. 12, 1950 6 Sheets-Sheet 2

INVENTOR.
Werner G. Seck
BY
Harry S. Dumars
ATTORNEY.

Sept. 28, 1954    W. G. SECK    2,689,969
SUCTION CLEANER HAVING PROPELLING
HANDLE AND FILTER BAG ASSEMBLY
Filed Dec. 12, 1950    6 Sheets-Sheet 3

INVENTOR.
Werner G. Seck
BY
Harry S. Dumarsh
ATTORNEY.

Fig.6

INVENTOR.
Werner G. Seck
BY
Harry S. Demarrs
ATTORNEY.

Sept. 28, 1954  W. G. SECK  2,689,969
SUCTION CLEANER HAVING PROPELLING
HANDLE AND FILTER BAG ASSEMBLY
Filed Dec. 12, 1950  6 Sheets-Sheet 5

INVENTOR.
Werner G. Seck
BY
Harry S. DeMasse
ATTORNEY.

Fig. 9

Patented Sept. 28, 1954

2,689,969

UNITED STATES PATENT OFFICE 2,689,969

SUCTION CLEANER HAVING PROPELLING HANDLE AND FILTER BAG ASSEMBLY

Werner G. Seck, North Canton, Ohio, assignor to The Hoover Company, North Canton, Ohio, a corporation of Ohio Application December 12, 1950, Serial No. 200,391

22 Claims. (Cl. 15—351)

1

This invention relates to suction cleaners and more particularly to a unique and improved mode of constructing and mounting the propelling handle and filter assembly thereon.

The invention is exceptionally well suited for use with the simplest and most inexpensive type of disposable paper filters which are subject to premature failure in use if proper precautions are not taken to safeguard the walls thereof against flexure as the propelling handle pivots. Previously proposed constructions having a similar objective are subject to numerous shortcomings which have been obviated in a novel and highly satisfactory manner by the present invention. My simple construction and arrangement of parts makes use of a filter adapter flexibly coupled to the cleaner proper and a single clamp of novel design for clamping both the filter and the protective appearance bag therefor to the adapter as well as for clamping this assembly to the propelling handle. Opening of the clamp expands the mouth of the appearance bag, releases the filter and frees the adapter for movement independently of the handle.

Another important feature includes a unique and common support for the adapter and the propelling handle by means of which both of these units pivot about the same axis in the interest of greater efficiency in operation and economy in construction and maintenance.

It is therefore an object of the invention to provide a suction cleaner of unique design featuring simplicity of design, low production cost, higher efficiency, greater convenience to use and service, and improved utility.

Another object of the invention is the provision of an improved filter assembly.

Still another object is the use of a simplified construction for locking the filter in place, holding the appearance envelope closed and constraining the filter assembly to move in unison with the propelling handle, as well as one which quickly and simultaneously releases each of these elements for independent movement when it is desired to service the filter assembly.

A further object is the provision of a new and improved mode of constructing and mounting the propelling handle and filter assembly on the body of a cleaner.

Yet another object is the provision of a simple common clamp for the filter and the enclosing envelope therefor, as well as a novel mode of supporting this clamp in the interest of greater convenience and utility. Another feature is the use of this clamp to lock the flexible adapter to

2 move with the handle normally and yet release the adapter for independent movement when changing the filter.

Numerous other objects and advantages of the invention will become apparent from the following detailed specification for two illustrative embodiments of the invention taken with the accompanying drawings in which.

Figure 1:
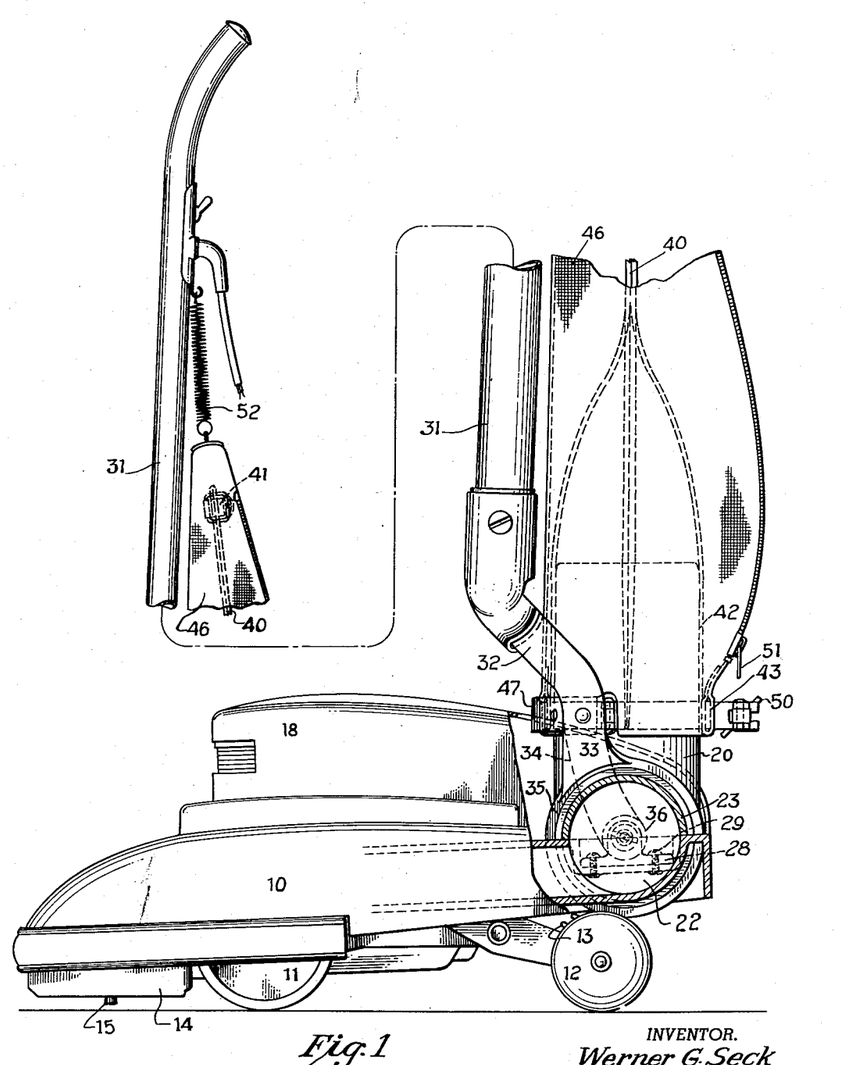
Figure 1 is a side of a suction cleaner according to one mode of practicing the invention showing a portion of the rear corner broken away.

The first embodiment of the invention is shown as incorporated in a suction cleaner having a main body casting 10 supported on a pair of front carrier wheels 11 and a rear wheel carriage 12 spring biased away from the under side of the body by coil springs 13. The forward portion of the body is provided with the customary downwardly opening suction nozzle 14 rotatively supporting the usual agitator indicated at 15. The main body is provided with a horizontally disposed fan chamber 16 having a fan eye 17 in communication with suction nozzle 14.

Although the drawings do not illustrate the details, it will be understood that a vertical axis motor-fan unit is supported on the fan chamber beneath the removable motor hood 18. This unit may be of any known construction and includes an electric motor for driving a radial blade fan located in the fan chamber.

Figures 2, 4:
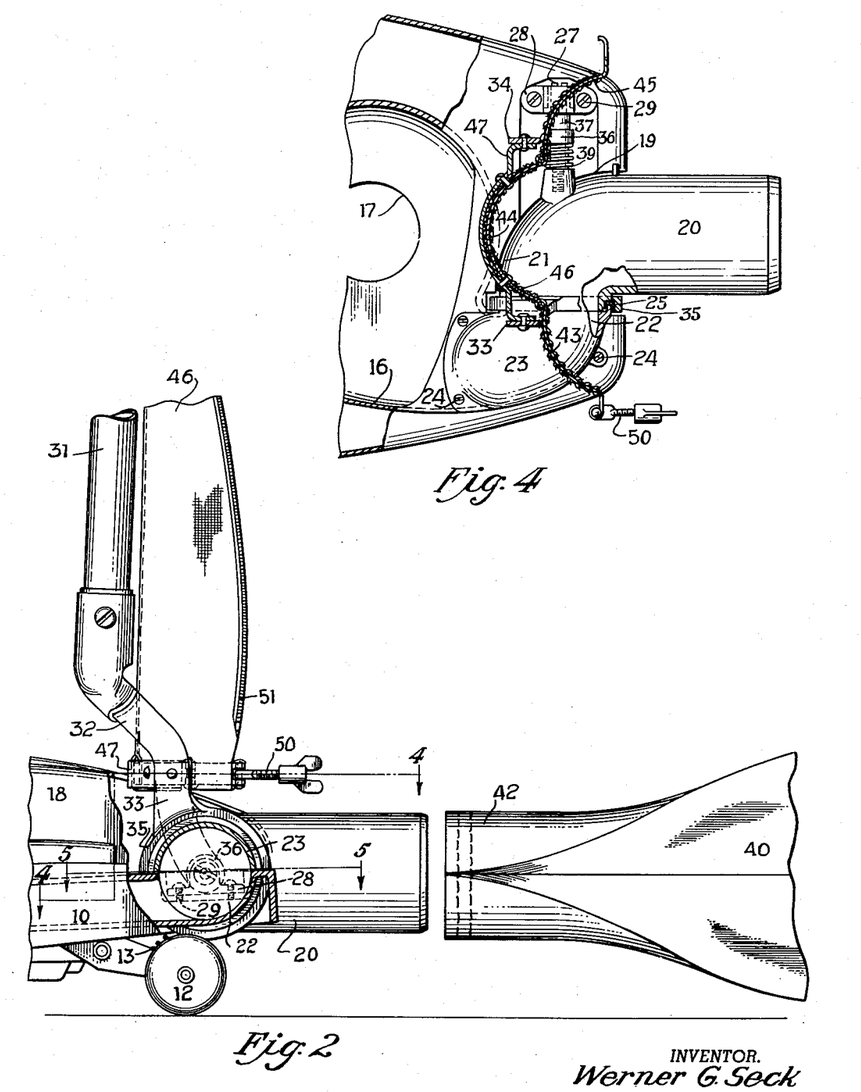
Figure 2 is a fragmentary view showing the filter assembly clamp open and the adapter pivoted to the horizontal position in readiness for the placement of a new filter.
Figure 4 is a top plan along line 4—4 on Figure 2.

As appears more clearly from Figure 4, the rear end of the main body casting is notched at 19 to accommodate a filter adapter formed by the L-shaped tubular member 20. The shorter leg 21 of this adapter has an open end located in a vertical plane spaced to one side and parallel to the longitudinal center line of the cleaner and opening into air discharge conduit 22 extending rearwardly from the discharge side of the suction fan. The lower half of conduit 22 is formed in the main body casting while its top half is defined by a removable cover plate 23 held in place by screws 24.

Figure 5:
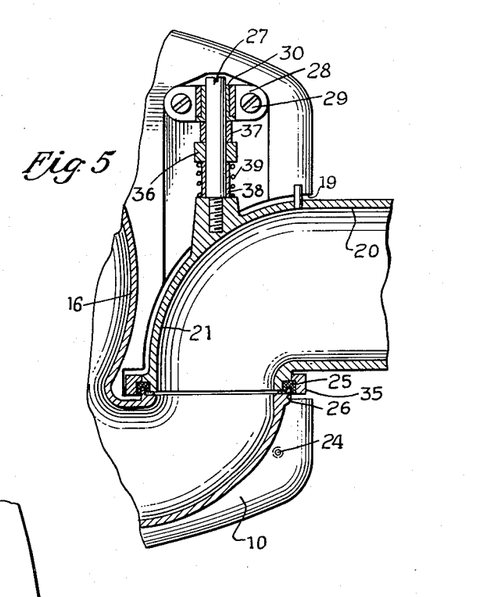
Figure 5 is a sectional view along line 5—5 on Figure 2.
Figure 6:
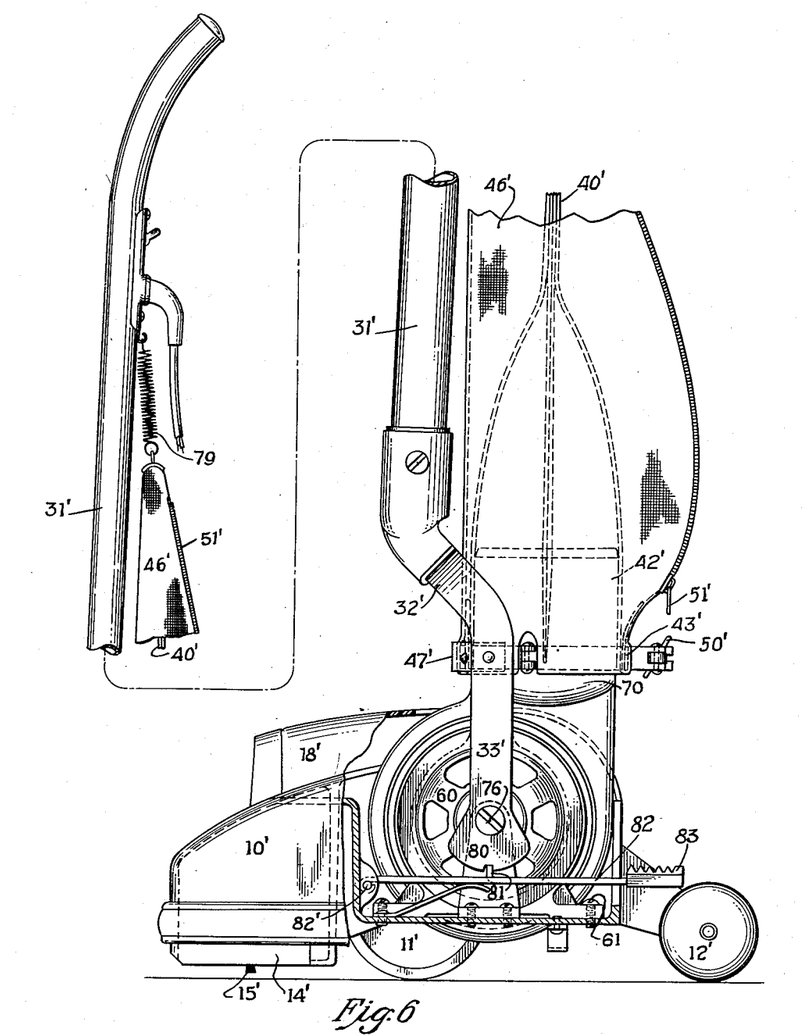
Figure 6 is a side elevational view of a second embodiment with parts broken away.
Figure 7:
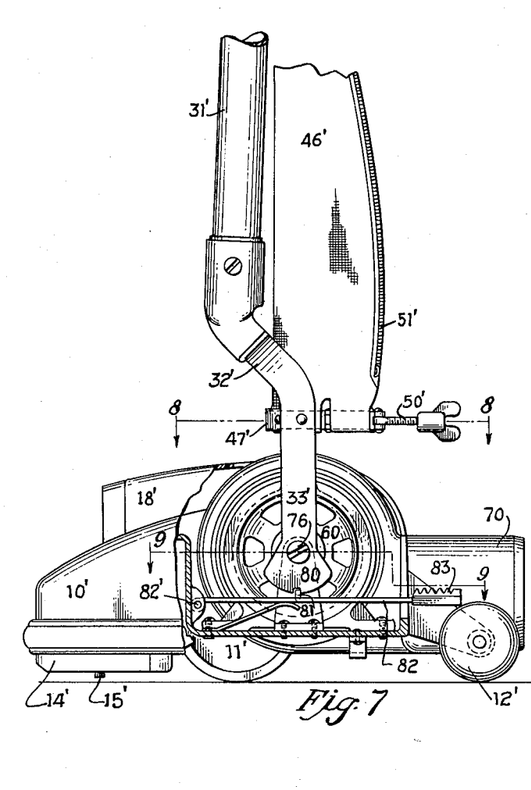
Figure 7 is a view of Figure 6 showing the filter clamp release and the adapter swung to a convenient filter changing position.

The inlet end 21 of adapter 20 is rotatively journaled in the end of discharge conduit 22, while the opposite side of the adapter is rotatively supported upon the rear, right hand corner of the cleaner body. The bearing supports for the adapter may be constructed as best illustrated in Figure 5. Thus, Figure 5 shows that the inlet end of the adapter is journaled upon the inner half of a channel shaped bronze ring 25 carried on an annular lip 26 at the end of the air discharge conduit. Supporting the opposite side of the adapter is a spindle 27, the outer end of which is rotatively mounted in a bearing 30 carried by a bracket 28 removably secured to the cleaner body by screws 29.

Figure 3:
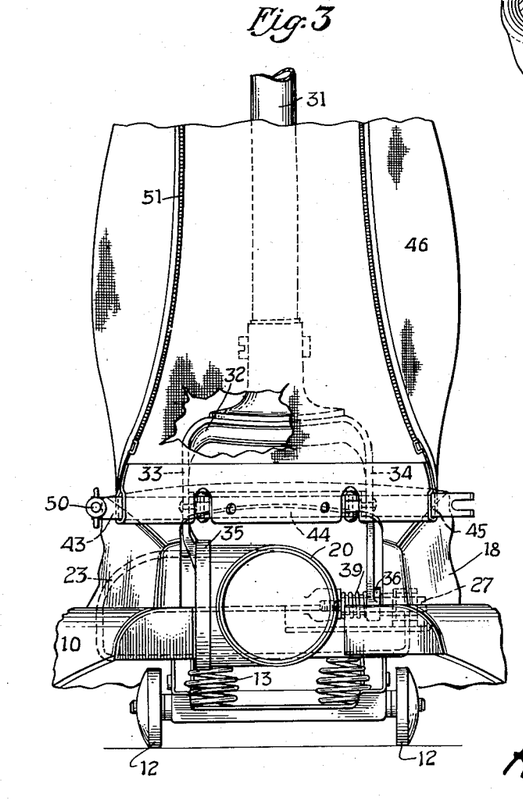
Figure 3 is a view from the right hand side of Figure 2.

Propelling handle 31 is pivoted about the same axis as the filter adapter and makes use of the same journal. Thus, the lower end of the handle is detachably secured to a bail 32 having side members 33 and 34 shaped as illustrated in Figures 1 and 3. Side member 33 is provided with a large diameter bearing ring 35 which is mounted upon the outer half of bearing ring 25. The other side member 34 has a small diameter bearing ring 36 which is journaled on spindle 27 intermediate spacer thimbles 37 and 38. Compression spring 39 serves to hold the adapter firmly seated upon bearing 25 in an air tight manner. As will be observed from Figures 1 and 2, the lower portions of the side members of the bail straddle the adapter and support the handle forwardly of the adapter and the filter assembly.

As best shown in Figures 1 and 3, side members 33 and 34 are joined at their upper ends and provide a socket for seating the lower end of the handle proper. A through bolt forms a convenient means of releasably locking the handle in the socket on the upper side of bail 32. The junction of side members 33 and 34 with the handle socket is sufficiently broad to provide a low position hand grip by which the cleaner can be readily picked up and carried on stairways as well as to and from the place of storage.

The outer, discharge end of the adapter may be of any desired shape other than the circular shape herein shown and has a length sufficient to form a firm seat for the inlet end of paper filter bag 40. The filter proper may be formed in any suitable manner and the top may be permanently closed or, if preferred, it may be provided with a removable closure clip 41 to permit re-use. The inlet neck 42 is gathered during manufacture to a size to telescope over the adapter freely and yet so as to be readily clamped thereto in an air tight chamber.

The filter clamp is best illustrated in Figures 2 and 4 as comprising three light metal bands 43, 44 and 45. Middle strip 44 is shaped to conform to the forward side of the filter seating surface of the adapter tube and is rigidly secured to a supporting member 47 carried between side members 33 and 34 of the handle bail. One end of members 43 and 45 is hingedly secured to the ends of strap 44 and these members are sewed into the lower rim of appearance envelope 46. The free ends of strips 43 and 45 may be releasably secured together in any suitable manner as by a toggle clamp or a thumb screw fastener 50.

It will be noted that the appearance bag has an opening extending upwardly from the lower end opening from a point opposite the mating ends of the clamping band. This opening is normally closed by a hookless fastener 51 which opens upwardly. While the drawings do not so illustrate, it will be understood that the inner wall of the clamping members may be provided with a resilient covering to provide for manufacturing tolerances and to insure that the filter is firmly clamped to the adapter when the clamp is in closed position.

Operation

Let it be assumed that the cleaner is assembled as illustrated in Figure 1. The usual service cord is connected to an electrical outlet after which the motor can be energized by closing the control switch located near the handle grip. The handle can be pivoted rearwardly to its normal operating position after releasing the usual handle control detent. As the handle is pivoted upwardly and downwardly in propelling the cleaner over the carpet, it will be clear that the entire filter assembly including the filter proper, the appearance bag and the filter adapter pivot in unison with the handle and without the possibility of any relative movement whatsoever between the handle and the filter assembly. This is due to the fact that the filter clamp not only clamps the filter and the appearance envelope to the filter adapter, but also provides a positive connection between the filter assembly and the handle bail, thus insuring that the entire lower end of the filter assembly pivots with the handle. The upper end of the filter assembly is connected to the upper portion of the handle by tension spring 52 thereby insuring that the upper end of the assembly moves with the handle.

As the cleaner is propelled backwardly and forwardly over the carpet being cleaned, the motor-fan unit sucks the dirty air stream upwardly through nozzle 14, through the fan chamber, and discharges it through conduit 22 and adapter 20 into the filter bag. After a volume of dirt has accumulated in the filter it is a very simple matter to replace the filter by a new one, thus restoring the full efficiency of the cleaner. This is accomplished by placing the handle in its vertical storage position where it is locked by the handle control detent. The operator then opens closure 51 upwardly and releases fastener 50 of the filter clamp so that members 43 and 45 thereof can be swung to the open position shown in Figure 4. Thus, the rear and sides of the appearance bag are moved away from the filter and the adapter, the filter is released from the adapter, and the adapter together with the filter is free to pivot backwardly to the horizontal position indicated in Figure 2. Filter 40 is then removed from the adapter to a point of disposal and a new filter bag is telescoped over the adapter. Thereafter the adapter is swung upwardly and the filter clamp is closed and locked by thumb screw 59 thereby firmly clamping the filter to the adapter. As soon as closure 51 on the appearance bag is pulled downwardly, the cleaner is ready for further operation.

Second embodiment

A second embodiment of the invention is illustrated in Figures 6 to 9. To avoid needless repetition, the same or similar elements are indicated by the same reference characters as in the first embodiment distinguished by a prime. One of the principal distinctions over the first embodiment is that the axis of the motor-fan unit extends horizontally transversely of the cleaner body, and that the fan chamber therefor is formed integrally with the filter adapter.

Figure 8:
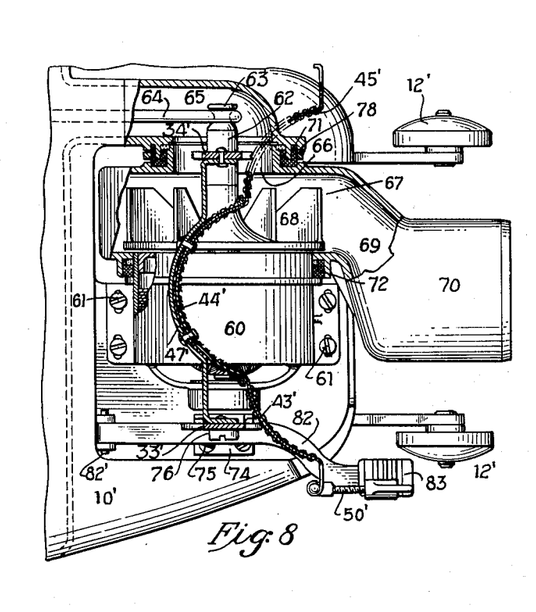
Figure 8 is a sectional view along line 8—8 on Figure 7.

Viewed from the top, the main body casting 10' is of U-shape with the suction nozzle 14' extending across the bight of the U and with the legs of the U extending rearwardly thereof to support the motor-fan unit therebetween. As best illustrated in Figure 8, driving motor 60 is removably secured to one leg of the body casting by screws 61. The motor shaft 62 carries a belt pulley 63 supporting a flexible driving belt 64 for agitator 15'. This belt extends through the suction air passageway 65 which leads into fan eye 66 of fan chamber 67 in which suction fan 68 is located. The exhaust air passage 69 for the fan chamber communicates with the inlet of tubular filter adapter 70.

Figure 9:
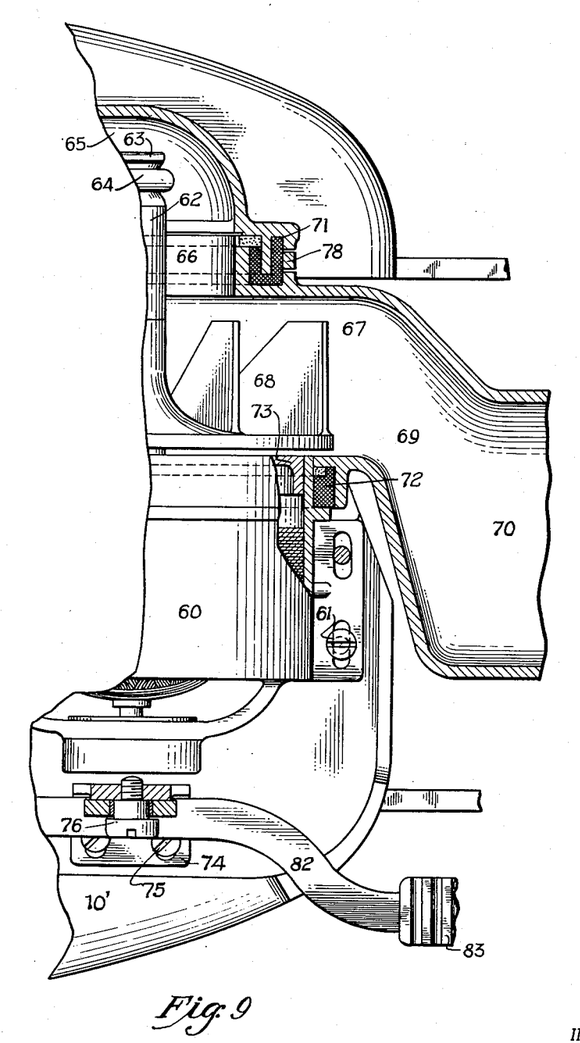
Figure 9 is a sectional view along line 9—9 on Figure 7.

Adapter 70 and the entire fan chamber are rotatively supported upon the cleaner body such as in the manner illustrated in Figures 8 and 9. Thus, the fan eye 66 of the fan chamber is journaled upon a channel shaped bronze bearing 71 carried by the main body. The opposite side of the fan chamber is journaled upon a bronze ring 72 surrounding the end of motor 60. The back wall 73 of the fan chamber is shown as a separate element sealed to the fan end of the motor, but it may be formed integrally with the fan chamber.

Propelling handle 31' is provided with a detachable bail 32' having side members 33' and 34'. Member 33' is journaled on a supporting bracket 74 secured to the cleaner body by screws 75. The axis of pivot pin 76 is in alignment with the axis of the motor-fan unit, as clearly appears from Figures 6 and 7. Side member 34 of the handle bail carries a ring 78 which is journaled about the periphery of bearing 71 in the space provided therefor between the fan casing and the adjacent portion of the cleaner body.

The handle is provided with a control for locking it in its upright parking position comprising a control sector 80 on side member 33' of the bail and a foot operated detent 81. This detent is carried on a lever 82 pivoted to the cleaner body at 82' and having a foot pedal 83 conveniently accessible to the operator. This pedal is spring biased into engagement with sector 80 so as to automatically lock the handle in its upright position when it is raised thereto. A similar control can be readily added to the construction shown in Figures 1 to 5.

The paper filter bag 40' is made in the same manner as described above and telescopes over the end of adapter tube 70. This filter is enclosed by an appearance bag 46' the upper end of which is connected to the propelling handle by tension spring 79. The filter clamping ring comprising members 43', 44', 45' and 50' is constructed and supported in the same manner as described in connection with the first embodiment.

*Operation*

As will be obvious from the foregoing description, the second embodiment functions similarly to the first described embodiment. The principal distinction is that both the filter adapter and the fan chamber are firmly connected to the propelling handle by the filter and appearance bag clamp. As a consequence, the entire filter assembly, including the filter adapter and the fan chamber, pivot in unison with the handle about a common axis coinciding with the axis of the motor-fan unit.

When it is desired to replace the filter, the operator locks the handle in the storage position, opens slide fastener 51' on the appearance bag and releases the filter clamp. This permits the operator to swing the back portion of the appearance bag forwardy to the sides of the cleaner body and to pivot filter 40' and the adapter rearwardly to the horizontal. After replacing the filter and returning the adapter to the vertical position, the filter clamp is closed about the adapter and slide fastener 51' is pulled downwardly restoring the cleaner to operation.

While I have shown but two embodiments of my invention it is to be understood that these are to be taken as illustrative only and not in a limiting sense. I do not wish to be limited to the particular structure shown and described but to include all equivalent variations thereof except as limited by the scope of the claims.

I claim:

1. In combination with a suction cleaner having a wheel supported body provided with a suction nozzle, a motor-fan unit including an air discharge conduit and filter adapter flexibly supported on said cleaner, said filter adapter being formed to receive a filter bag inlet over its outer end, an appearance bag for enclosing said filter having an open lower end adapted to closely embrace said adapter adjacent said filter inlet and including a releasable clamp positioned to clamp both said appearance bag and said filter inlet to said adapter, a propelling handle pivotally supported on said cleaner adjacent said adapter, and means connecting the lower end of said appearance bag to the adjacent portion of said handle whereby said adapter and filter are constrained to pivot in unison with said handle when said clamp is closed and whereby said adapter is free to pivot independently of said handle when said clamp is open.

2. The combination defined in claim 1 wherein said connection between said handle and the lower end of said appearance bag includes said releasable clamp.

3. A propelling handle and filter assembly for a suction cleaner comprising, an elongated handle, a tubular filter adapter, means rotatably connecting the lower ends of said handle and said adapter about a common pivot axis, the other end of said adapter being formed to receive the inlet end of a filter thereover, an appearance bag for enclosing a filter having an open lower end formed to embrace said adapter closely, resilient means connecting the upper end of said bag to said handle, releasable clamping means supported in the open lower end of said appearance bag opposite the filter seating portion of said adapter operable to clamp both said appearance bag and said filter to said adapter, means connecting said clamp to said handle, said appearance bag having an opening extending longitudinally thereof from said open end at a point adjacent the ends of said clamp whereby when the latter is opened said adapter is free to pivot away from said handle and both said filter and said appearance bag are released from said adapter and whereby when said clamp is closed about said adapter the latter is movable in unison with the handle about said means rotatably connecting the lower ends thereof.

4. The combination defined in claim 3 wherein said means rotatably connecting the lower ends of said handle and of said adapter includes the body of a suction cleaner.

5. The combination defined in claim 3 wherein said means rotatably connecting the lower ends of said handle and of said adapter includes a motor-fan unit of a suction cleaner.

6. The combination defined in claim 3 wherein said means rotatably connecting the lower ends of said handle and of said adapter includes a fan chamber rigidly connected with said adapter and pivotal therewith in unison with said handle when said clamp is closed and independently thereof when said clamp is open.

7. In combination with a suction cleaner having a main body provided with an exhaust air passage, a tubular adapter including means flexibly connecting the same to said air passage, a single clamping means for clamping the inlet of a filter bag to said adapter, rigid supporting means for said clamp having a pivotable connection with said cleaner body, and an appearance envelope for said filter having an open lower end secured to said clamp whereby closure of said clamp about said adapter serves to clamp both said appearance envelope and said filter to said adapter and whereby opening of said clamp releases said filter from said adapter and frees said adapter for movement independently of said clamp and the supporting means therefor.

8. A suction cleaner as defined in claim 7 wherein said supporting means for said clamp includes means for supporting a propelling handle for said cleaner.

9. A suction cleaner having a wheel supported body, a motor driven suction fan including a fan chamber rotatably supported on said body, a tubular exhaust conduit rigidly connected to said chamber and rotatable therewith, the outer end of said conduit being adapted to receive the inlet of a filter thereover, means for clamping said filter to said conduit in an air tight manner, means pivotally mounted on said cleaner for supporting said clamp, and control means for locking said clamp supporting means against pivotal movement whereby when said clamp is opened to release said filter said conduit is rotatable away from said clamp supporting means.

10. A suction cleaner as defined in claim 9 including a propelling handle for said cleaner, and means for releasably connecting said handle to said filter clamp supporting means.

11. A suction cleaner having a wheel supported body provided with an air exhaust passage, a filter supporting adapter flexibly connected to the end of said exhaust passage, clamping means for clamping a filter inlet to the end of said adapter in an air tight manner, means independent of said adapter for pivotally supporting said clamp on said cleaner body whereby when clamp is closed against said adapter said clamp supporting means moves in unison with said adapter and whereby when said clamp is open said filter is released and said adapter is free to move independently of said adapter.

12. The combination with a suction cleaner having a wheel supported body provided with a suction nozzle at its forward end, a fan chamber centrally of said body, and an air exhaust passage terminating near the rear end of said body, of a rigid filter adapter including means swivelly connecting the inlet thereof to said exhaust passage, a propelling handle pivotally supported on said cleaner on an axis traversing said swivel connection, and manually operable clamp means carried on said handle adapted to encircle said filter adapter and operable to releasably clamp said adapter to said handle and a filter to said adapter whereby the opening of said clamp releases said filter and frees said adapter for pivotal movement independently of said handle.

13. The combination with a suction cleaner having a wheel supported body provided with suction creating means, an air exhaust passage leading from said suction means, a filter adapter flexibly connected to said passage, a propelling handle pivotally connected to said cleaner body adjacent said filter adapter, a filter clamp carried by said handle and cooperable with the discharge end of said adapter to releasably clamp the inlet of a filter thereto in an air tight manner and to hold said adapter in fixed relation to said handle so as to pivot therewith when said clamp is closed and to release said filter and said adapter when said clamp is open, said handle including means adjacent the lower end thereof and adjacent said filter clamp forming a hand grip by which said cleaner can be conveniently picked up and carried on stairways and from room to room.

14. A suction cleaner as defined in claim 13 wherein the lower end of said handle is forked, means supporting said filter clamp between the opposite side members of said handle fork and being spaced below the junction of said fork members to provide space for a hand grip at said junction whereby said cleaner can be conveniently picked up and transported on stairways and from room to room.

15. In combination with a suction cleaner having a wheel supported main body provided with an air exhaust passage located at a rear corner thereof and discharging transversely of said body toward the other rear corner, an elbow shaped filter adapter having an inlet end swivelly connected to the discharge end of said exhaust passage so that its other end is pivotable through a vertical plane extending longitudinally of said body, a propelling handle for said cleaner journalled thereto so as to pivot about the same axis as said adapter, said handle having the main portion thereof offset from said pivot axis, and releasable means for normally connecting said handle to said adapter so that said handle and adapter pivot in unison and so that said handle and adapter are free for independent pivotal movement relative to one another when said connection means is released.

16. The combination defined in claim 15 including a common bearing means about which said handle and said adapter are arranged to pivot.

17. The combination defined in claim 15 wherein said swivel connection for said adapter and said journal for said handle includes a pair of bearings spaced to either side of the longitudinal center line of said body, and means for pivotally supporting both said handle and said adapter on said pair of bearings.

18. The combination defined in claim 17 in which said means releasably connecting said handle and said adapter together includes a clamp mounted on said handle and embracing said adapter when closed, and means for opening said clamp to release said adapter for pivotal movement independently of said handle.

19. The combination defined in claim 17 wherein said means releasably connecting said handle and said adapter includes a clamp mounted on said handle and embracing the discharge end of said adapter and being operable when closed to clamp the inlet of a filter bag to said adapter and to cause said adapter to pivot in unison with said handle, said clamp including means for opening the same to release the filter for removal from said adapter and to release said adapter for piovtal movement independently of said handle.

20. The combination defined in claim 15 wherein the main body of said handle lies in a plane offset forwardly from said common pivot axis for said handle and adapter and wherein the discharge end of said adapter is located rearwardly of the main body of said handle and is povitable rearwardly of said handle when the same is in a vertical parked position and said releasable connection to said adapter is in position.

21. The combination defined in claim 15 wherein said releasable connection between said handle and said adapter includes a clamp supported on one of these elements and arranged to embrace a portion of the other when closed and to be disengaged therefrom when open, an appearance bag for a filter having its lower end secured to said clamp so as to embrace said adapter and conceal said clamp when the clamp is closed, and means for attaching the upper end of said appearance bag to an upper portion of said handle.

22. The combination defined in claim 15 including journal means on the opposite side of said elbow shaped adapter from said swivel connection forming a second means which cooperates with said swivel connection in pivotally supporting said adapter on said cleaner body, and spring means for resiliently urging said adapter into firm seating engagement with said swivel connection.

References Cited in the file of this patent

UNITED STATES PATENTS

| Number | Name | Date |
|---|---|---|
| 1,805,174 | Gudka | May 12, 1931 |
| 2,009,455 | Replogle | July 30, 1935 |
| 2,061,330 | Riebel | Nov. 17, 1936 |
| 2,085,042 | Replogle | July 29, 1937 |
| 2,089,232 | Wells et al. | Aug. 10, 1937 |
| 2,092,778 | Riebel | Sept. 14, 1937 |
| 2,098,028 | Burkhardt | Nov. 2, 1937 |
| 2,123,914 | Replogle | July 19, 1938 |
| 2,130,495 | Hoover | Sept. 20, 1938 |
| 2,165,677 | Riebel | July 11, 1939 |
| 2,165,678 | Riebel | July 11, 1939 |
| 2,176,467 | Milner et al. | Oct. 17, 1939 |
| 2,177,969 | Wells et al. | Oct. 31, 1939 |